United States Patent [19]

Furutera et al.

[11] Patent Number: 4,662,191
[45] Date of Patent: May 5, 1987

[54] ABSORPTION - TYPE REFRIGERATION SYSTEM

[75] Inventors: Masaharu Furutera, Maizuru; Tetsuro Furukawa, Suita; Yoshiaki Matsushita, Maizuru, all of Japan

[73] Assignee: Hitachi Zosen Corporation, Osaka, Japan

[21] Appl. No.: 800,507

[22] Filed: Nov. 21, 1985

[30] Foreign Application Priority Data

Nov. 24, 1984 [JP] Japan .................................. 59-248386

[51] Int. Cl.⁴ .............................................. F25B 15/00
[52] U.S. Cl. ...................................... 62/476; 62/238.3
[58] Field of Search ...................... 62/476, 148, 238.3, 62/485; 165/104.16

[56] References Cited

U.S. PATENT DOCUMENTS

| 3,440,832 | 4/1969 | Aronson | 62/476 X |
| 4,458,499 | 7/1984 | Grossman | 62/148 |
| 4,458,500 | 7/1984 | Grossman et al. | 62/476 |

Primary Examiner—Lloyd L. King
Attorney, Agent, or Firm—Barnes, Kisselle, Raisch, Choate, Whittemore & Hulbert

[57] ABSTRACT

An absorption refrigeration system includes an evaporator 1, an absorber 6, a regenerator 9, and a condenser 13. In the evaporator 1, water as a refrigerant is caused to evaporate by depriving a chill carrier fluid 4 of its heat. The water vapor 5 from the evaporator 1 is absorbed into an absorbent consisting of an aqueous lithium bromide solution in the absorber 6, heat being generated thereby. The regenerator 9 receives the diluted absorbent 7 from the absorber 6 and heat same with a heating fluid 11 to evaporate the absorbed water from the absorbent. The concentrated absorbent 10 resulting from the step of regeneration is returned to the absorber 6, while the water vapor 12 generated in the regenerator 9 is introduced into the condenser 13. A supply of condensing water 14 is sprayed into the condenser 13 for direct contact with the incoming water vapor 12 to condense the latter. A portion of the collected water 15 in the condenser 13 is transferred through piping 16 to the absorber 6, in which it is heated with the absorption heat generated therein. Another portion of the water 15 is supplied to the evaporator 1 through a branch line 2 having a pressure reducing valve 3 and is evaporated in the evaporator 1.

7 Claims, 1 Drawing Figure

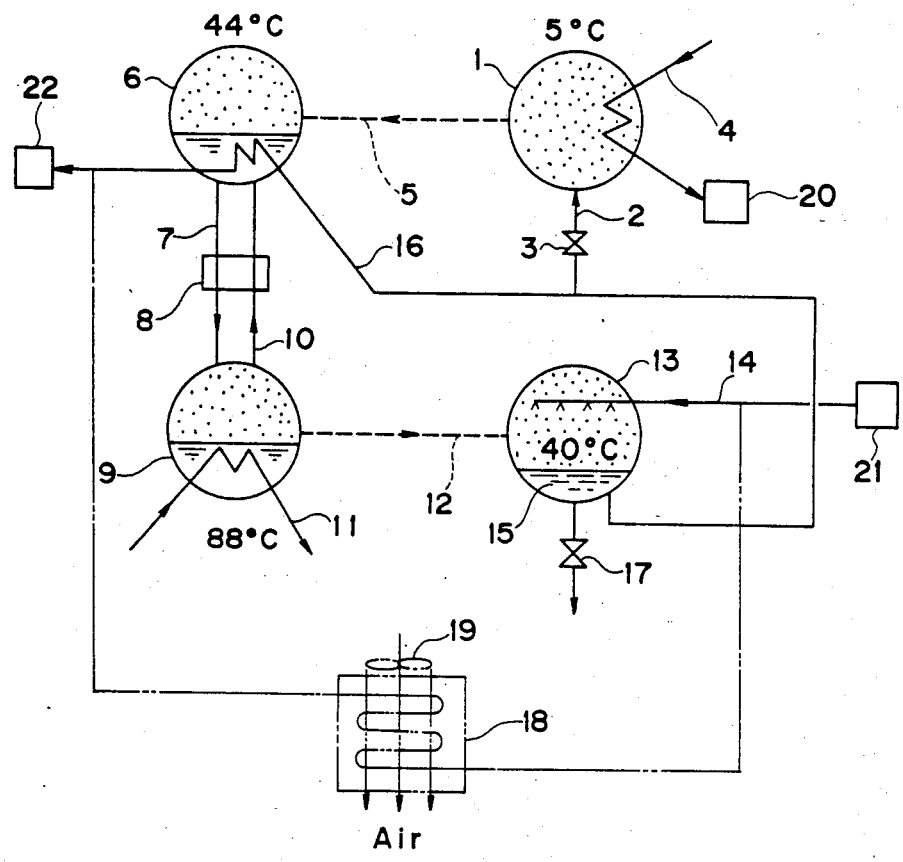

ABSORPTION - TYPE REFRIGERATION SYSTEM

FIELD OF THE INVENTION

This invention relates to an absorption-type refrigeration system and, more specifically, to an absorption-type refrigeration system which employs water as a refrigerant and aqueous lithium bromide (LiBr) as an absorbent.

BACKGROUND ART

An absorption refrigeration system of the type which uses water and aqueous lithium bromide is disclosed in Japanese Published Unexamined Patent Application No. 58-40468, for example. This system consists chiefly of an evaporator, an absorber, a regenerator, and a condenser. In the evaporator, a chill carrier fluid is deprived of its heat and cooled by the evaporation of water (refrigerant). The water vapor from the evaporator is absorbed into an aqueous solution of lithium bromide (absorbent) in the absorber with attendant heat generation. In the regenerator, the diluted absorbent received thereinto from the absorber through a heat exchanger is heated by a heating fluid, whereby the water is evaporated from the absorbent. The concentrated absorbent thus obtained through the regeneration process is returned via aforesaid heat exchanger to the absorber, in which it is reused for water vapor absorption. In the condenser there are provided heat transfer tubes through which a cooling fluid flows, so that the water vapor introduced from the regenerator into the condenser will become condensed as it goes into contact with heat conduction surfaces of the tubes.

In the above prior-art system, since the condensation of the water vapor produced in the regenerator is carried out in the condenser indirectly through the heat transfer tubes, it is necessary, in order to increase the rate of condensation, to make the temperature of the cooling fluid considerably lower than the condensation temperature of the water vapor and to provide a large heat conduction area as by using a large number of heat transfer tubes. As a result, the prior-art system has a disadvantage that an external system to be connected to the condenser is limited to one capable of generating a low-temperature cooling fluid, otherwise it being necessary to redesign the entire refrigeration system on a case-by-case basis so as to adapt it to the external system. Another difficulty is that since the condenser must provide a large heat conduction area, the cost of the overall refrigeration system becomes inevitably high.

SUMMARY OF THE INVENTION

This invention has as its object the provision of an absorption-type refrigeration system which is well compatible with a variety of external systems, less expensive to manufacture, and can be designed to be smaller in size.

In order to accomplish the above object, this invention provides an absorption-type refrigeration system comprising an evaporating unit in which a refrigerant is caused to evaporate by depriving a chill carrier fluid of its heat, an absorbing unit in which the refrigerant vapor received from said evaporating unit is absorbed into a liquid absorbent with attendant heat generation, a regenerating unit for concentrating the diluted absorbent received from said absorbing unit by heating same with a heating fluid to evaporate the refrigerant content thereof so that the absorbent is reused in the absorbing unit, and a condensing unit for condensing the refrigerant vapor received thereinto from said regenerating unit by bringing same into direct contact with a liquid phase refrigerant supplied by spraying.

Various features and advantages of the invention will be readily appreciated from the following description of an embodiment thereof taken in connection with the accompanying drawing.

BRIEF DESCRIPTION OF THE DRAWING

The single drawing is a schematic diagram showing one form of absorption-type refrigeration system embodying the invention.

DESCRIPTION OF EMBODIMENT

In the single FIGURE, reference numeral 1 designates an evaporator to which water as a refrigerant is supplied through a branch line 2 provided with a pressure reducing valve 3. In the evaporator 1, the water is caused to evaporate by receiving heat from a chill carrier fluid 4 which passes through the evaporator 1. The temperature and pressure in the evaporator 1 are 5° C. and 6.5 mmHg, for example, respectively. The chill carrier fluid 4 enters the evaporator 1 at an inlet temperature of 12° C., for example, and is cooled therein down to 7° C., for example, being subsequently supplied to an external utilization system 20.

The water vapor 5 generated in the evaporator 1 enters an absorber 6, in which it is absorbed into an absorbent consisting of an aqueous solution of lithium bromide to generate heat. The pressure in the absorber 6 is also 6.5 mmHg. The absorbent 7 diluted through the water vapor absorption leaves the absorber 6 at an outlet temperature of 44° C., for example, and passes through a heat exchanger 8, whereby it is heated up to 75° C., for example, being then fed into a regenerator 9. Such preheating of the absorbent 7 prior to entry thereof into the regenerator 9 is intended to reduce the thermal input requirements of the regenerator 9.

In the regenerator 9 there is a heating fluid 11 passing therethrough, the heat of which serves to evaporate the absorbed water content of the dilute absorbent 7. The concentrated absorbent 10 resulting from the regeneration process leaves the regenerator 9 at an outlet temperature of 88° C., for example, and has its temperature lowered to 55° C., for example, after passing through the heat exchanger 8. The absorbent 10 is subsequently fed into the absorber 6, in which it is reused for the water vapor absorption. The pressure in the regenerator 9 is 55 mmHg. As the heating fluid 11, a 110° C. steam may be used, for example, which generates condensation heat as it is condensed into water at the same temperature (110° C.), for example, whereby the diluted absorbent 7 is regenerated.

The water vapor 12 having a temperature of 40° C., for example, and generated in the regenerator 9 is introduced into a condenser 13, in which the water vapor 12 is condensed by direct contact with water of 38° C., for example, supplied separately by spraying through a line 14 from an external supply source 21. The pressure in the condenser 13 is also 55 mmHg. The collected water 15 of 40° C., for example, is partially transferred through piping 16. A part of the water 15 flowing through the piping 16 is supplied as refrigerant into the evaporator 1 through the aforementioned branch line 2, while the remaining part of the water is supplied to the absorber 6, in which it is heated to 42° C., for example, by the absorption heat generated in the absorber 6, the heated water being subsequently supplied for utilization by an external utilization system 22. A surplus of the collected water 15 is discharged out of the refrigeration system through a discharge valve 17.

Alternatively, as shown in phantom lines in the FIGURE, the heated water obtained by flowing through the absorber 6 may be passed in a closed passage through an indirect cooler such as an air-cooled heat exchanger 18 provided with a fan 19 and returned to the condenser 13 for the condensation process. In this case, since no additional water (refrigerant) is supplied to the condenser 13 to give rise to excess water, it is unnecessary to provide the discharge valve 17. Further, according to this alternative arrangement, since a completely closed circuit is formed for the flow of the refrigerant (water), it is possible to avoid the ingress into the refrigeration system of non-condensable gases such as air which would invite vacuum leakage and efficiency deterioration. It should be noted that the aqueous lithium bromide (absorbent) becomes corrosive under the presence of air, and for this reason also the ingress of air must be prevented.

According to the absorption-type refrigeration system of the invention, as above described, the water vapor 12 is condensed in the condenser 13 by direct contact with the sprayed water, so that not much temperature difference is required between the water vapor 12 and the condensing water (e.g., water at 38° C. against water vapor at 40° C. in the embodiment shown), there being not much limitation imposed on the ability of the external system or the air-cooled heat exchanger 18 to be connected as a supply source to the line 14. Furthermore, the system of the invention involves no necessity of using a large number of heat transfer tubes in the condenser 13 to provide a large heat conduction area, consequently leading to simplified construction, cost saving, and good possibility of size reduction.

The various temperatures given in conjunction with the embodiment shown are for illustrative purposes only, and are not to be construed to limit the invention; rather, it is to be understood that the scope of the invention is defined solely by the appended claims.

What is claimed is:

1. An absorption-type refrigeration system comprising an evaporating unit in which a refrigerant is caused to evaporate by depriving a chill carrier fluid of its heat, an absorbing unit in which the refrigerant vapor received from said evaporating unit is absorbed into a liquid absorbent with attendant heat generation, a regenerating unit for concentrating the diluted absorbent received from said absorbing unit by heating same with a heating fluid to evaporate the refrigerant content thereof so that the absorbent is reused in the absorbing unit, and a condensing unit for condensing the refrigerant vapor received thereinto from said regenerating unit by bringing same into direct contact with a liquid phase refrigerant supplied by spraying.

2. A system as set forth in claim 1 wherein the liquid phase refrigerant collected in said condensing unit is supplied to said absorbing unit through piping and is heated with the absorption heat generated in said absorbing unit.

3. A system as set forth in claim 2 wherein said piping includes a branch line for supplying a portion of the liquid phase refrigerant to said evaporating unit, said branch line being provided with a pressure reducing valve.

4. A system as set forth in claim 1 wherein the liquid phase refrigerant heated by said absorbing unit is passed in a closed passage to said condensing unit through an indirect cooler.

5. A system as set forth in claim 4 wherein said indirect cooler is an air-cooled heat exchanger.

6. A system as set forth in claim 1 wherein the diluted absorbent supplied from said absorbing unit to the regenerating unit and the concentrated absorbent supplied from said regenerating unit to said absorbing unit are heat exchanged by means of a heat exchanger.

7. A system as set forth in claim 1 wherein said refrigerant is water, and said absorbent is an aqueous solution of lithium bromide.

* * * * *